United States Patent [19]

Socha

[11] Patent Number: 5,135,793

[45] Date of Patent: Aug. 4, 1992

[54] FIBERGLASS REINFORCED POLYESTER LAMINATED HARDBOARD PANELS

[75] Inventor: Robert P. Socha, Newport Beach, Calif.

[73] Assignee: The Standard Oil Company, Cleveland, Ohio

[21] Appl. No.: 528,674

[22] Filed: May 24, 1990

[51] Int. Cl.$^5$ .......................... B32B 1/04; B32B 5/16; B32B 21/04; B32B 27/00

[52] U.S. Cl. .................................. 428/74; 52/309.17; 52/DIG. 7; 428/284; 428/285; 428/287; 428/289; 428/290; 428/326; 428/423.7; 428/425.1; 428/438; 428/481; 428/537.1

[58] Field of Search ................ 428/326, 287, 284, 74, 428/286, 423.7, 425.1, 481, 537.1, 285, 289, 290, 438; 52/DIG. 7, 309.17

[56] References Cited

U.S. PATENT DOCUMENTS

| | | |
|---|---|---|
| 2,784,763 | 3/1957 | Shorts .................. 156/201 |
| 2,927,623 | 3/1960 | Huisman et al. ................ 156/200 |
| 3,077,000 | 2/1963 | Huisman et al. ................ 156/205 |
| 3,145,502 | 8/1964 | Rubenstein ................ 52/309.17 |
| 3,413,188 | 11/1968 | Allen ................ 428/481 |
| 3,756,901 | 9/1973 | Veneziale, Jr. ................ 428/481 |
| 4,082,882 | 4/1978 | Weinstein et al. ................ 428/537.1 |
| 4,315,967 | 2/1982 | Prior et al. ................ 428/286 |
| 4,587,141 | 5/1986 | Cooley ................ 428/425.1 |
| 4,695,501 | 9/1987 | Robinson ................ 428/287 |
| 4,824,507 | 4/1989 | D'Amico ................ 428/74 |
| 4,828,643 | 5/1989 | Newman et al. ................ 428/326 |
| 4,923,756 | 5/1990 | Chung et al. ................ 428/423.7 |

Primary Examiner—George F. Lesmes
Assistant Examiner—James D. Withers
Attorney, Agent, or Firm—Larry W. Evans; Joseph G. Curatolo; Scott A. McCollister

[57] ABSTRACT

A laminate having high strength and excellent resistance to moisture comprised of a fiberglass reinforced polyester panel adhesively attached with a water reactive adhesive to a tempered hardboard panel.

8 Claims, No Drawings

FIBERGLASS REINFORCED POLYESTER LAMINATED HARDBOARD PANELS

BACKGROUND OF THE INVENTION

This invention relates to fiberglass reinforced polyester (FRP) laminated hardboard panels. More particularly, this invention relates to FRP hardboard panels that may be easily assembled in a large size with high strength and moisture resistance.

The panels of this invention are particularly well suited for use as exterior walls of structures which require high strength and longterm durability when faced with environmental exposure. In particular, these panels are well suited as exterior walls of recreational vehicles (RV).

DESCRIPTION OF THE PRIOR ART

In the design of laminated panels for use in applications such as RV walls it is important that they possess high strength and resistance to swelling and decomposition when exposed to water.

Problems in forming panels for use in RV construction occur because traditional thin fiber/particle board is formed using a urea formaldehyde binder system. These urea bound products swell excessively when exposed to moisture and decompose. For this reason, luan, a type of polywood, is used as a substrate upon which FRP panels are laminated. Luan however, is also subject to degradation when exposed to water, and suffers from size constraints.

FRP has also been laminated to a medium density fiber board, prepared through a dry process using a phenolic binder. FRP panels laminated on this type of substrate have increased water resistance, but display relatively poor strength characteristics.

It is necessary in this field to have FRP laminates which possess high strength, high water resistance and can be formed to a size satisfactory for industry requirements.

SUMMARY OF THE INVENTION

It is a primary objective of this invention to provide an improved FRP laminated panel.

It is a further object of this invention to provide FRP laminated panels with increased strength and moisture resistance for use in RV walls.

Additional objectives and advantages of the invention will be set forth in part in the description which follows and in part will be obvious from the description, or may be learned by practice of the invention. The objectives and advantages of the invention may be realized and attained by means of the instrumentalities and combinations particularly pointed out in the appended claims.

To achieve the foregoing objectives in accordance with the purpose of the invention as embodied and broadly described herein, the panel of this invention comprises a fiberglass reinforced polyester panel laminated to a tempered hardboard. The tempered hardboard is prepared in a wet process using a water resistant binder. Preferably the binder is a phenolic resin.

In a preferred embodiment the laminated FRP layer is attached to the hardboard via a high-solids urethane adhesive using pressure. Preferably, the pressure is applied by vacuum.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention defined by the appended claims.

In accordance with the invention, the FRP laminated hardboard panels are prepared using a fiberglass reinforced polyester panel laminated to a tempered hardboard panel by means of a water reactive adhesive. A high solid urethane is the preferred adhesive. The adhesive application of the FRP panel to the hardboard can be accomplished by any method known to one skilled in the art. Preferably, a room temperature vacuum bagging cure procedure is used.

The FRP panel is generally prepared by coating a lower carrier film of a suitable material on a conveyor or belt. Preferably, the carrier film is a cellulose material. Next, the lower carrier film is covered with a heat settable resin. Preferably, the resin is of the epoxy or polyester type. In addition, the resin may contain a catalyst to facilitate polymerization. Matts of glass fiber or loose fibrous material are then deposited on the lower carrier film and resin.

In a further preferred embodiment, after the matted or stranded glass material is fed onto the moving conveyor belt coated with the film and resin, a plurality of strands of glass or other thread are brought into the matt in a parallel relationship. This provides a great deal of reinforcement to the completed material.

Once the glass fibers, heat settable resin and optional reinforcing threads are in place, they are coated with an upper carrier film similar in nature to the lower film. The upper and lower carrier films are sealed to each other along their outer edges, thereby forming an envelope which encases the composite matt and resin. The composite matt with its protective carrier films is then lead onto a perforated belt conveyor which moves over a vacuum chamber. The envelope enclosing the matt will be drawn into intimate contact with the conveyor belt. The envelope with its enclosed fiber and resin composition is pulled into a compact forms. The composite sheet is heated in an oven to accelerate setting of the resin. The process of forming FRP panels is fully described in U.S. Pat. Nos. 2,784,763; 2,927,623 and 3,077,000, herein incorporated by reference.

The FRP panel can be contoured into any shape necessary to meet the final product requirements of the laminated panel. Generally, the FRP panel is flat and smooth however, a corrugated or ribbed surface can be formed. Furthermore, the FRP panel can be formulated with a resin of any color to prepare FRP laminates with a color suitable to the final product requirements.

The substrate of the present invention is a hardboard prepared in a wet process using a phenolic binder system, and tempered for strength. The hardboard has high density, high strength and excellent resistance to moisture. This product is available from Superwood Corporation, Superior, Wis. a subsidiary of Georgia-Pacific Corporation.

In the process for production of the hardboard, roundwood is reduced to chips of about ⅝″ by about ¾″. The chips are cooked for softening and removal of some natural resins. The softened chips are then shredded to form fibres. The fibers are treated with binders to increase strength and moisture resistance. Preferably the binder is of the phenolic-formaldehyde type. Next, the pulp is fed onto a continuously traveling mesh screen, water leaves the pulp through the screen, facilitated by the use of a series of press rolls. Finally, the "wet" mat is pressed at 500-1500 psi. at 380°-550° F. Generally, multiple hydraulic presses are used while the board is heated by water, oil or steam. This operation welds the fibers together to form a "hard" board. The hardboard can then be treated with siccative resins and baked to facilitate tempering.

The FRP panel and the hardboard are laminated one to another using a high-solids water activated urethane adhesive. Preferably, the lamination is made of room temperature using a vacuum bag cured procedure wherein the FRP panel is adhesively contacted to the hardboard on a table with a slight vacuum below. In the alternative, a pinch-roll procedure can be used.

The product laminate should have a high density. Preferably the density is between 65 lbs/ft$^3$ and 75 lbs/ft$^3$. The high density results in increased strength and moisture resistance because water is absorbed more slowly. Accordingly, the product laminate has a modulus of rupture greater than 5000 p.s.i. Preferably them modulus of rupture is above 10,000 p.s.i. Also, the twenty-four hour water absorption will be below 5%. Preferably the absorption is below 4%.

FRP Comparative Example 1

An FRP 0.040" thick panel was laminated to a medium density fiber board of approximately 0.105" thickness. The fiber board substrates were prepared using a dry process and a phenolic formaldehyde binder. The FRP panel was laminated to the substrate using a urethane adhesive system.

EXAMPLE A

A 0.040" thick FRP panel was laminated to a tempered hardboard of approximately 0.105" thickness using a high solids urethane adhesive. The hardboard substrate was prepared using a wet process and a phenolic based binder system.

Table 1 shows comparative testing results for the laminates of comparative example 1 and example A. It is evident that the laminate of the present invention (example A) displays superior strength and water resistance is each test catagory in Table 1.

TABLE 1

PHYSICAL PROPERTIES AND PERFORMANCE CHARACTERISTICS OF LAMINATED BOARDS

| Tests Performed | Comparative Example 1 | Example A |
| --- | --- | --- |
| 1. Tensile Strength, psi ASTM D1037 sections 130-131 | 2,958 | 6,741 |
| 2. Flexural Strength, psi ASTM D790, (four point method) | 7,046 | 9,592 |
| 3. Mullen Burst Strength, psi ASTM D2738-68T | 705 | 1,012 |
| 4. Modulus of Rupture, psi ASTM D1037M sections 126-129 | 3,392 | 10,485 |
| 5. "Bond Strength", psi Tensile Strength of flat sandwich construction. ASTM C-297 | 268 | 458 |
| 6. Twenty-Four Hour Water Absorption, % ASTM D1037 section 134 | 5.6 | 3.9 |
| 7. Twenty-Four Hours Thickness Swell, % ASTM D1037 section 134 | 19.4 | 8.3 |
| 8. Water Wicking, mm, max SAE J913, Feb. 1985 | 36.0 | 15.0 |
| 9. Density, lbs/ft$^3$ ASTM D1037 sections 136-137 | 61.2 | 71.1 |
| 10. Laminate Thickness, inch | 0.144 | 0.148 |

Thus it is apparent that there has been provided, in accordance with the invention, an FRP laminated panel that fully satisfies the objects, aims, and advantages set forth above. While the invention has been described in conjunction with specific embodiments thereof, it is evident that many alternatives, modifications, and variation will be apparent to those skilled in the art in light of the foregoing description. Accordingly, it is intended to embrace all such alternatives, modifications, and variations as fall within the spirit and broad scope of the appended claims.

What is claimed:

1. A laminate comprising a fiber glass reinforced polyester panel adhesively attached by means of a water reactive adhesive to a tempered hardboard panel, wherein said laminated has a modulus of rupture greater than 5000 p.s.i. and a twenty-four hour water absorption of less than 5.0%.

2. The laminate of claim 1, wherein said modulus of rupture is greater than 10,000 p.s.i.

3. A laminate comprising a fiberglass reinforced polyester panel adhesively attached by means of a water reactive adhesive to a tempered hardboard substrate, wherein said tempered hardboard is prepared using a water phenol based water resistant binder, said laminate has a modulus of rupture greater than 5000 p.s.i. and a twenty-four hour water absorption of less than 5.0%.

4. The laminate of claim 3, wherein said hardboard has a density of about 65 lbs/ft$^3$ to about 75 lbs/ft$^3$.

5. The laminate of claim 3, wherein said modulus of rupture is greater than about 10,000 p.s.i.

6. The laminate of claim 5, wherein said adhesive is a highsolids water activated urethane.

7. The laminate of claim 3, wherein said fiberglass reinforced polyester panel is attached to said tempered hardboard through a vacuum bag cure procedure.

8. The laminate of claim 7 wherein the density of said laminate is greater than 65 lbs/ft$^3$.

* * * * *